(12) United States Patent
Unterhuber

(10) Patent No.: US 7,513,355 B2
(45) Date of Patent: Apr. 7, 2009

(54) ABUTMENT MODULE

(75) Inventor: Sebastian Unterhuber, Köngen (DE)

(73) Assignee: Helmut Wörner, Denkendorf (DE)

( * ) Notice: Subject to any disclaimer, the term of this patent is extended or adjusted under 35 U.S.C. 154(b) by 7 days.

(21) Appl. No.: 11/861,040

(22) Filed: Sep. 25, 2007

(65) Prior Publication Data
US 2008/0073180 A1 Mar. 27, 2008

(30) Foreign Application Priority Data
Sep. 25, 2006 (EP) .................................. 06400031

(51) Int. Cl.
*B65G 15/64* (2006.01)
(52) U.S. Cl. ................... 198/345.3; 193/35 A
(58) Field of Classification Search ............. 198/345.1, 198/345.3; 193/35 A
See application file for complete search history.

(56) References Cited

U.S. PATENT DOCUMENTS

| | | | |
|---|---|---|---|
| 5,154,277 A | | 10/1992 | Murakami |
| 5,168,976 A | * | 12/1992 | Kettelson ................. 198/345.3 |
| 5,211,276 A | * | 5/1993 | Clopton ................... 198/345.3 |
| 6,112,877 A | | 9/2000 | Herrick, IV |
| 6,290,051 B1 | * | 9/2001 | Herrick, IV ............. 198/345.3 |
| 7,299,911 B2 | * | 11/2007 | Worner et al. ............ 198/345.3 |
| 2003/0173187 A1 | | 9/2003 | Johnson et al. |

FOREIGN PATENT DOCUMENTS

| | | |
|---|---|---|
| DE | 3003674 A1 | 1/1980 |
| DE | 19543797 A1 | 5/1997 |
| EP | 0484648 B1 | 4/1991 |
| EP | 1522383 A2 | 4/2005 |
| FR | 2856998 A1 | 1/2005 |

\* cited by examiner

*Primary Examiner*—James R Bidwell
(74) *Attorney, Agent, or Firm*—Browdy and Neimark, PLLC

(57) ABSTRACT

An abutment module, in particular for automatic processing and conveying systems, comprises an abutment member arranged on a main unit for objects moving in a plane of motion in a current working movement direction, such abutment member being able to be shifted by of a setting member between an abutment position located in the plane of motion and a release position lying underneath the plane of motion, and a guide is provided having at least one guide track, on which the abutment member is positively guided at a first point between the abutment position and the release position, the abutment member being so pivotally connected at a second point remote from the first point with a setting element that in the case of a lowering movement of the abutment member between the abutment position and the release position a pivoting of the abutment member takes place in the working movement direction.

13 Claims, 6 Drawing Sheets

ABUTMENT MODULE

BACKGROUND OF THE INVENTION

The invention relates to an abutment module, in particular for automatic processing and conveying systems, comprising an abutment member arranged on a main unit for objects moving in a plane of motion in a current working movement direction, such abutment member being able to be shifted by means of a setting member between an abutment position located in the plane of motion and a release position lying underneath the plane of motion.

RELATED ART

An abutment module of this type is disclosed in the European patent publication EP 0 484 648. The abutment described therein is able to be shifted by means of a pneumatically operating setting piston out of the path of motion of arriving workpieces and back into the same. For actuation by a compressed air an air connection is provided in the housing, by way of which compressed air may be supplied in a controlled manner. Furthermore the abutment is provided with a damping means so that the movement of the abutting workpieces can be damped.

As a rule automatic processing and conveying systems, for which the abutment module is preferentially employed, are constantly in operation so that an abutting object is thrust in the working movement direction against the abutment member. Owing to the pressing force which is exerted by the abutting object on the abutment member there is substantial friction during lowering movement of the abutment member. The force effort to be produced by the setting member for lowering the abutment member is accordingly substantial.

SHORT SUMMARY OF THE INVENTION

One object of the invention is to provide an abutment module of the type initially mentioned with which the lowering of the abutment member is possible with less force.

This aim is to be achieved by an abutment module with the features of the independent claim 1. Further developments of the invention are represented in the dependent claims.

The abutment module in accordance with the invention is characterized in that a guide means is provided having at least one guide track, on which the abutment member is positively guided at a first point between the abutment position and the release position, the abutment member being so pivotally connected at a second point remote from the first point with a setting element that in the case of a lowering movement of the abutment member between the abutment position and the release position a pivoting of the abutment member takes place in the working movement direction away from the object.

In the case of the above mentioned prior art the lowering of the abutment member is performed by a truly vertical lowering movement. The force effort to be provided by the setting member is large. On lowering the abutment member there is accordingly, owing to the pressing force at the abutting object, a high degree of friction. On the other hand in the invention the abutment member is moved downward during the lowering movement in the working movement direction so that even during lowering movement of the abutment member (while same is still in the movement plane) the abutting object is moved on in the working movement direction. Accordingly the abutment member may be entrained on farther for some distance in the working movement direction with the result that the friction between the struck object and the abutment member is reduced during lowering. It is even possible for the force exerted by the struck object on the abutment member to cause a pivoting movement of the abutment member in the working movement direction in the case of continuously operating processing and conveying system.

In the case of a further development of the invention the guide track extends at least partially obliquely to the movement plane of the object. Accordingly it is possible to impart an obliquely directed lowering movement on the abutment member at its first point. As an alternative it is possible to arrange the guide track vertically, i.e. perpendicularly to the movement plane. In this case as well the abutment member should be pivotally connected at the second point with the setting element so that when vertical lowering movement takes place at the first element pivots away about the first point in the working movement direction.

In the case of a further development of the invention the abutment member has at its top end an abutment-matching shape for the object, which during the movement of the abutment member between the abutment position and the release position describes a predetermined curve, more particularly above the movement plane in the working movement direction. The contact between the abutting object and the abutment member is conveniently linear though it can be sheet-like.

It is particularly preferred for the guide means to exhibit a slide guide, with at least one guide slide arranged on the main unit, in which at least one guide member formed on the abutment member at the first point is positively guided. The guide slide may be constituted by a guide groove and the guide member by a guide pin.

In a particularly preferred fashion a damping means, connected with the abutment member, is provided for damped movement of the abutment member from a first preabutment positioned short of the abutment position in the working movement direction, as far as the abutment position. In this respect the abutment member may, during its downward motion from the abutment position into the release position, be extended owing to the form of the guide track at least at the first point in the working movement direction underneath the movement plane to the level of the preabutment position. The abutment member is consequently set back even during the downward movement so that during the following upward movement the preabutment position is reached and the next object may be individualized.

In the case of a further development of the invention the setting member is coupled with the abutment member by force transmission means with the result that a drive force produced by the setting member is able to be transmitted as a greater force, which is available at the abutment member. Accordingly it is possible to also use setting members which produce a relatively small driving force and accordingly have small overall dimensions. This again means that the overall height, which is greatly dependent on the overall size of the setting member, may be kept relatively small.

In a particularly preferred manner the force transmission means are constituted by a lever transmission system.

As a lever transmission a lever means is suitable which is connected with the abutment member, comprising a first lever that on the one hand is connected pivotally on the setting member and is able to be linearly slid and on the other hand is articulated with a second lever formed on a setting element, the latter lever pivoting on the one hand on a stationary pivot pin formed on the main unit and on the other hand being supported in an articulating manner on the abutment member.

In principle besides lever transmission systems other transmission means are suitable, as for example gear wheel transmissions.

In the case of a further development of the invention the setting member possesses a drive element for producing a linear drive movement directed in parallelism to the movement plane, such motion being converted by conversion means into abutment member movement occurring between the abutment position and the release position of the abutment member.

In the case of the above mentioned prior art the drive movement occurs in a vertical direction, i.e. normally to the movement plane. The stroke of the drive element thus extends in a vertical direction and significantly influences the overall height of the drive module. On the other hand the effects on the overall height in the case of a linear drive movement parallel to the movement plane are far less.

Preferably the drive element is arranged in a linearly sliding manner in a drive socket designed to be parallel to the movement plane in the main unit. In an especially preferred case the setting member has its long side aligned generally parallel to the movement plane in the drive socket.

Further advantageous developments and convenient forms of the invention will be understood from the following detailed descriptive disclosure of some preferred embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
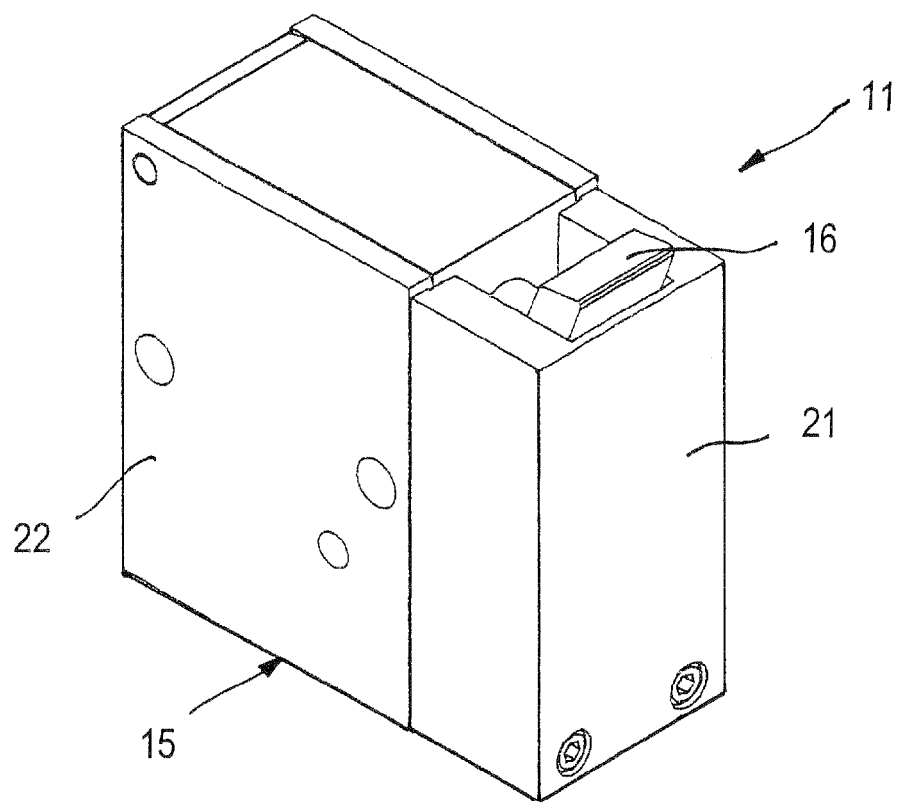
FIG. 1 shows a first embodiment of the abutment module in accordance with the invention in a perspective view.
Figure 2:
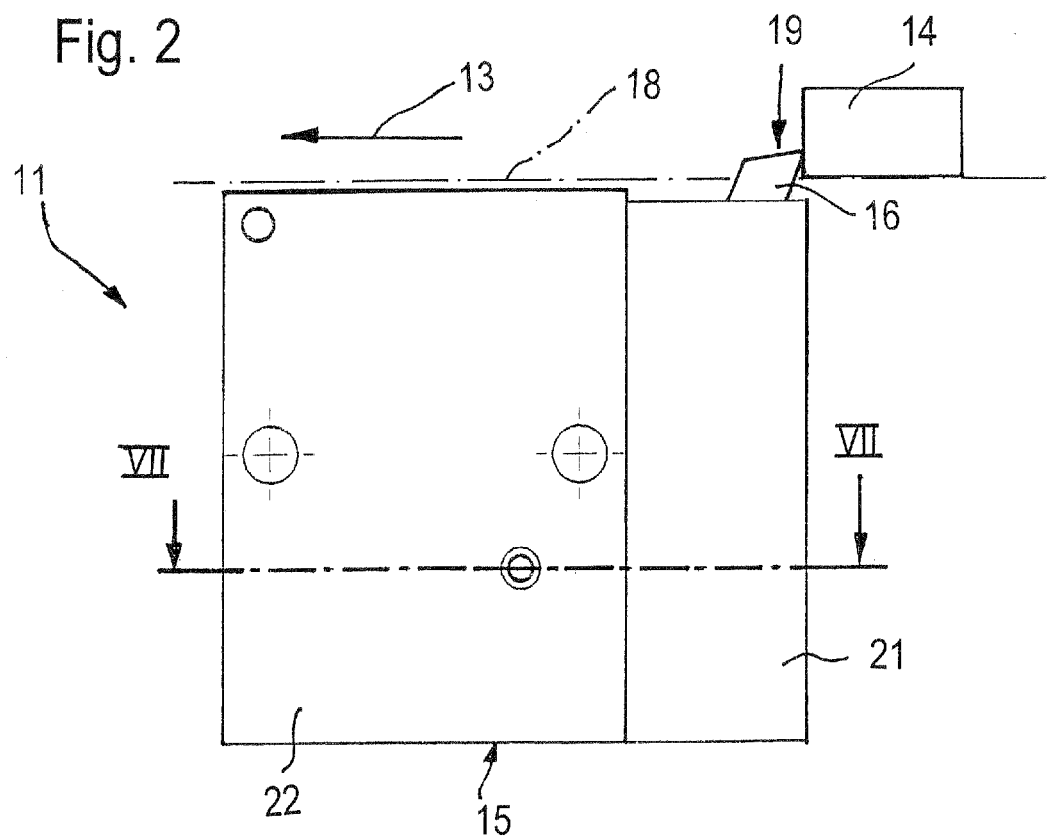
FIG. 2 shows the abutment module of FIG. 1 in a side view.

The FIGS. 1 through 7 show a first working example of the abutment module 11 in accordance with the invention, which in the following will be explained with reference to such a module having a damping means 12. However it is also possible to employ an abutment module without any damping means.

The abutment module 11 is preferably utilized in automatic processing and conveying means 70 in order to individualize objects 14, such as workpieces or the like, moving in a plane of motion 18 in a working movement direction 13. Following individualizing the objects 14 may then be individually processed, as for example machined, redirected or the like.

The abutment module 11 possesses a main unit 15, for example in the form of a rectangular block, on which an abutment member 16 is arranged which using a setting member 17 may be shifted out of the plane of motion 18 of the objects 14 and back into it. Furthermore the already mentioned damping means 12 is present, by means of which the abutment member 16 can be moved in a damped mode from a preabutment position 19 lying short of an abutment position 20 in the working movement direction 13 as far as the abutment position 20.

It is possible for the main unit 15 to comprise an abutment member carrier 21, in which the abutment member 16 is accommodated in a fashion to be described infra, and a setting member carrier 22 constructed separately from the abutment member carrier 21. In principle however an integral main unit 15 is possible.

Figure 4:
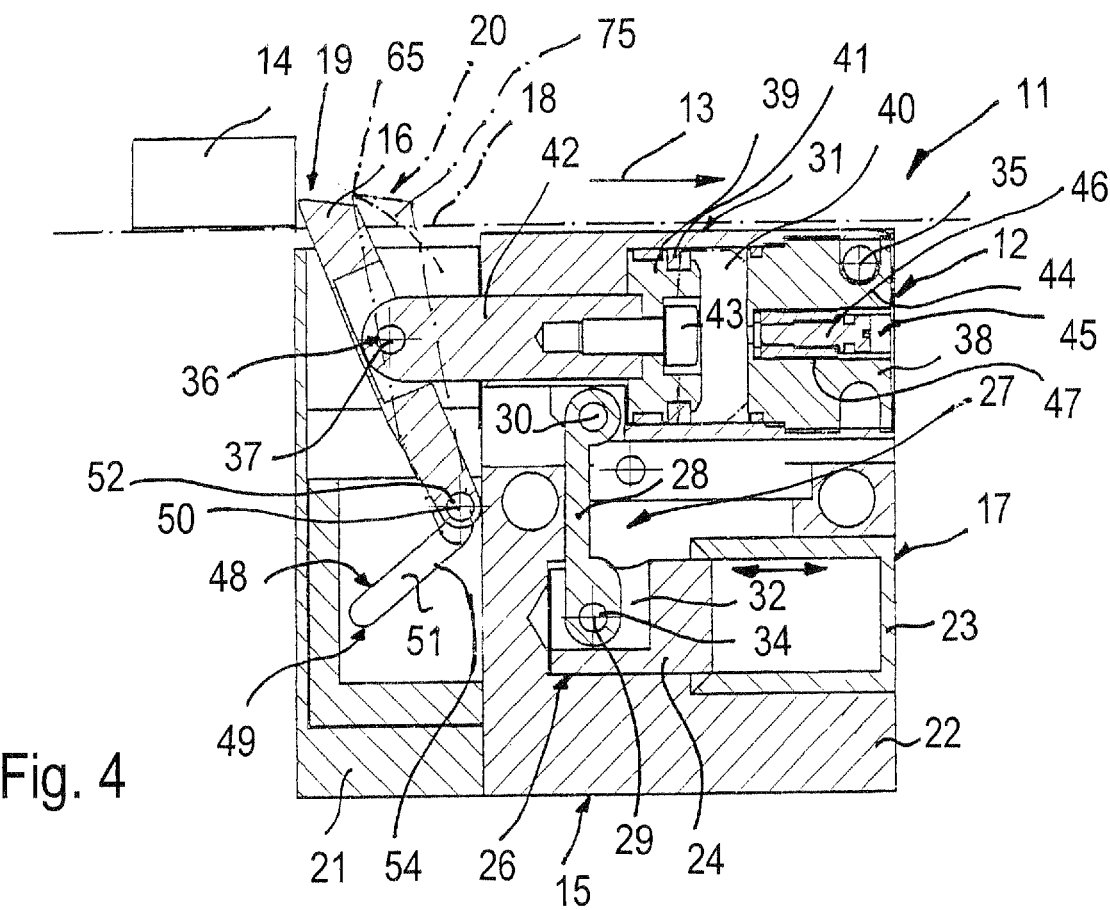
FIG. 4 shows the abutment module of FIG. 3 in a longitudinal section on the line IV-IV of FIG. 3.

As more especially illustrated in FIG. 4 as a setting member 17 an electrical linear drive in the form of an electromagnetic drive is provided. The electromagnetic drive possesses an electrically excitable electromagnet 23 with a more particularly U shaped yoke in which a drive element 24 in the form of an armature linearly slides. On excitation of the electromagnet the armature is drawn toward the yoke with the result that a drive movement is produced available for driving other parts. The drive movement takes place in parallelism to the plane 18 of motion of the objects 14 and is transmitted by conversion means to the abutment member 16 in a manner to be described in detail below, the abutment member 16 being accordingly shifted between its abutment position 20 and a release position 25 lying underneath the plane of movement. The drive element 24 designed in the form of an armature is furthermore guided linearly in a drive socket 26 provided in the main unit 15 and in particular in the setting member carrier 22. Furthermore the electromagnet 23 is essentially arranged with the longitudinal axis also parallel to the plane 18 of movement in the drive socket 26. The linear drive movement produced parallel to the plane 18 of movement offers the advantage that the stroke of the drive element 24 takes place in a horizontal direction and accordingly is without any influence on the overall height of the abutment module 11. Furthermore the electromagnet 23 has a relatively small effect on the overall height owing to its horizontal position.

A further reduction in the overall height and even in the overall size of the abutment module 11 may take place by the use of relatively small setting members 17 in conjunction with conversion means in the form of force transmission means so that even a relatively small drive force produced by the setting member 17 will be sufficient for moving the drive member, since the force transmission means leads to a greater force.

As a force transmission means a lever transmission is provided having a lever means 27, which is provided between the armature of the electromagnet 23 and the abutment member 16. The lever means 27 possesses a first lever 28 which on the one hand pivots about a first pivot axis 29 on the armature and on the other hand is connected at a second pivot axis 30 with a second lever 31.

Figures 7, 8:
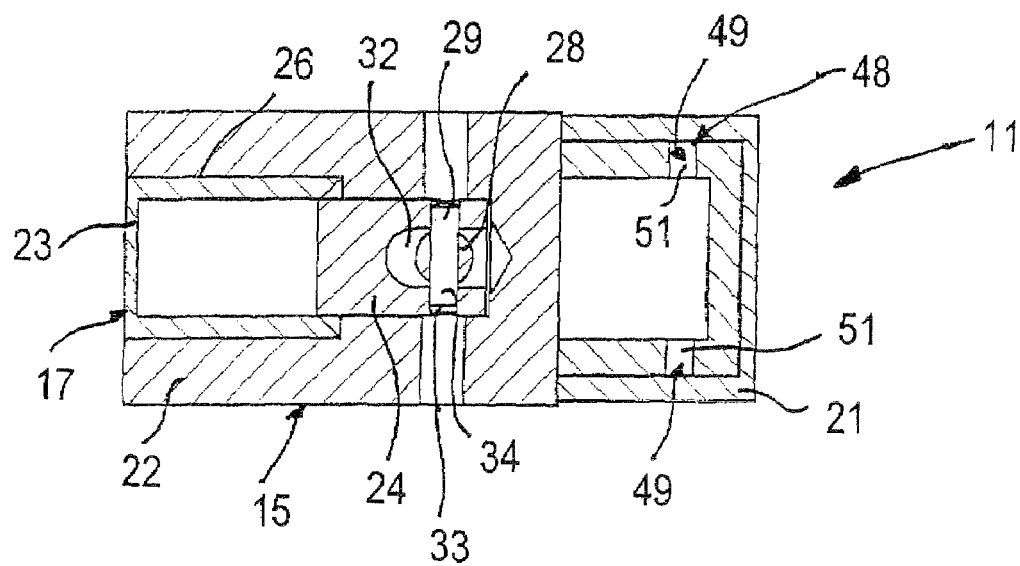
FIG. 7 represents the abutment module of FIG. 2 in a section taken on the line VII-VII of FIG. 2.
FIG. 8 shows a second embodiment of the abutment module in accordance with the invention in a longitudinal section.

As shown in FIG. 7 more particularly for this purpose there is a slot like opening 32 in the armature to receive the end of the first lever 28, the lever end being for its part provided with a through hole 33, through which a pin 34 extends. The pin 34 is for its part connected in a rotatable manner with the armature and accordingly constitutes the first pivot axis 29. The pivot bearing at the opposite end of the first lever 28 can be similar. The second lever 31 is on the one hand pivotally connected at a stationary third pivot axis 35 formed on the main unit 15 and on the other hand at a second position 36 is pivotally connected via a fourth pivot axis 37 with the abutment member 16.

The second lever 31 is constituted by a damping cylinder 38 of the damping means 12. It possesses a cylinder space 39, in which a damping piston 39 may reciprocate while making sealing contact with the wall of the cylinder space 40 by the intermediary of a piston seal means 41. The damping piston 39 is joined to a piston rod 42 by attachment means, for example by means of a screw connection 43. It is naturally also possible to provide an integral connection between the damping piston 39 and the piston rod 42.

Figure 3:
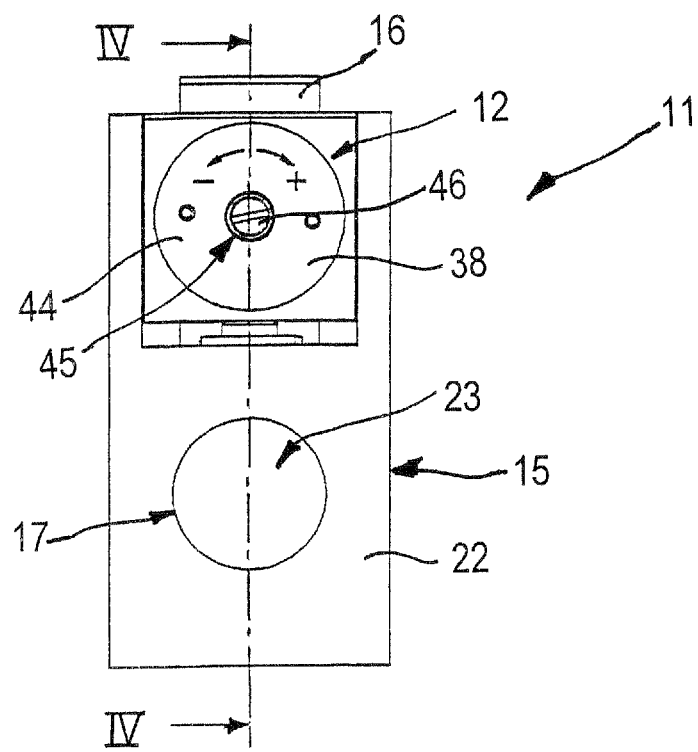
FIG. 3 is a rear elevation of the abutment module of FIG. 1 looking in the opposite direction to the working movement direction of the objects.
Figure 5:
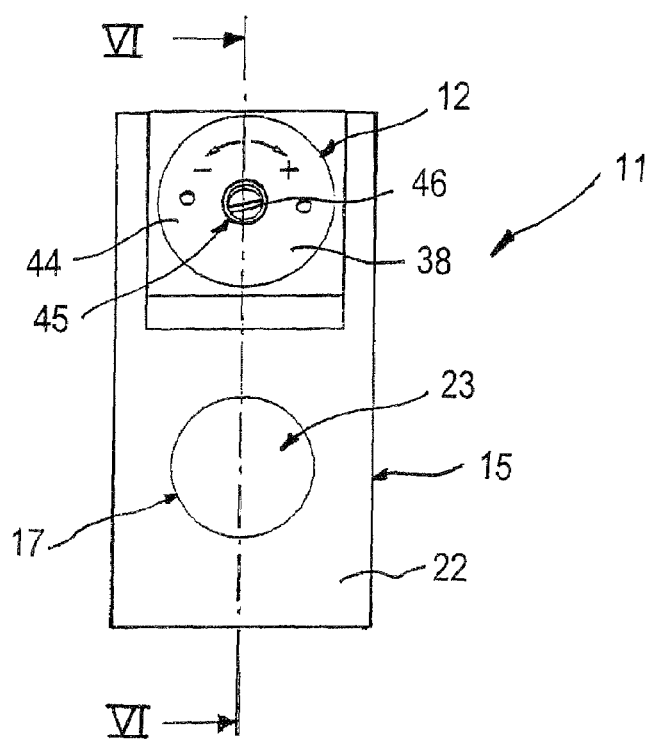
FIG. 5 is a rear view of the abutment module of FIG. 1, the abutment member being in the retracted position.
Figure 6:
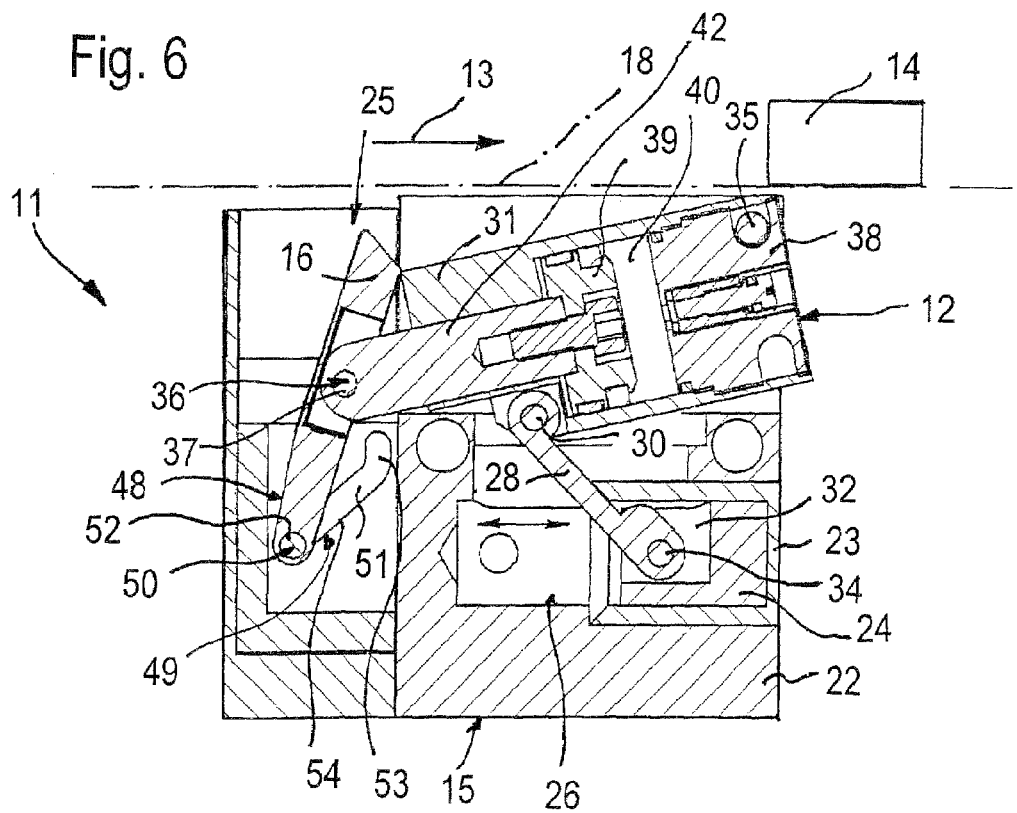
FIG. 6 shows the abutment module of FIG. 5 in a longitudinal section taken on the line VI-VI of FIG. 5.

At the end remote from the piston the piston rod 42 is as mentioned joined to the abutment member 16. It accordingly constitutes the setting element for the abutment member 16. Toward the outside of the main unit 15 the cylinder space 40 is closed by a cover 44. Within the cover 44 there is a choke means 45 constituting a flow resistor for the air exiting during a piston movement by way of a channel (not illustrated). For fine adjustment of the damping action there are furthermore adjustment means 46, as for example a movable set screw mounted in a cover channel 47, using which the outlet cross section for the exiting air may be selectively narrowed or widened with the result that the choking effect may be increased or reduced, the latter setting the damping action. As shown in FIGS. 3 and 5 in particular turning the set screw in the "+" direction will increase the damping effect, whereas turning the set screw in the " " direction will reduce the damping effect.

As mentioned the abutment member 16 is connected at a second position 36 with the piston rod 42 in a pivotal fashion. Additionally for this purpose a guide means 48 is provided, with at least one guide track 49, on which the abutment member 16 is guided in a positive manner at a first position 50 between the abutment position 16 and the release position 25.

As more especially shown in FIG. 7, the guide means 48 has a slide guide with two guide slides fashioned on the main unit in the form of guide grooves 51 in which an abutment member 16 (in the form of a guide pin 52) is positively guided. The guide pin 52 can pivot in the guide grooves 51. The guide grooves 51 respectively possess a head portion 53 extending generally vertically, i.e. perpendicular to the plane 18 of movement. This head portion 53 is required, since even during travel of the abutment member 16 away from the preabutment position 19 into the abutment position 20 a pivoting of the abutment member 16 takes place at the second position 36 around the fourth pivot axis 37, so that owing to the fa<ct that the piston rod 42 designed in the form of a setting element is positively guided by the damping piston 39 in the cylinder space 40 at a constant level, the abutment member 16 is thrust some distance downward. Adjoining the head portion 53 there is radiused portion leading to a guide portion 54 extending obliquely downward in a direction opposite to the working movement direction 13.

Figure 10:
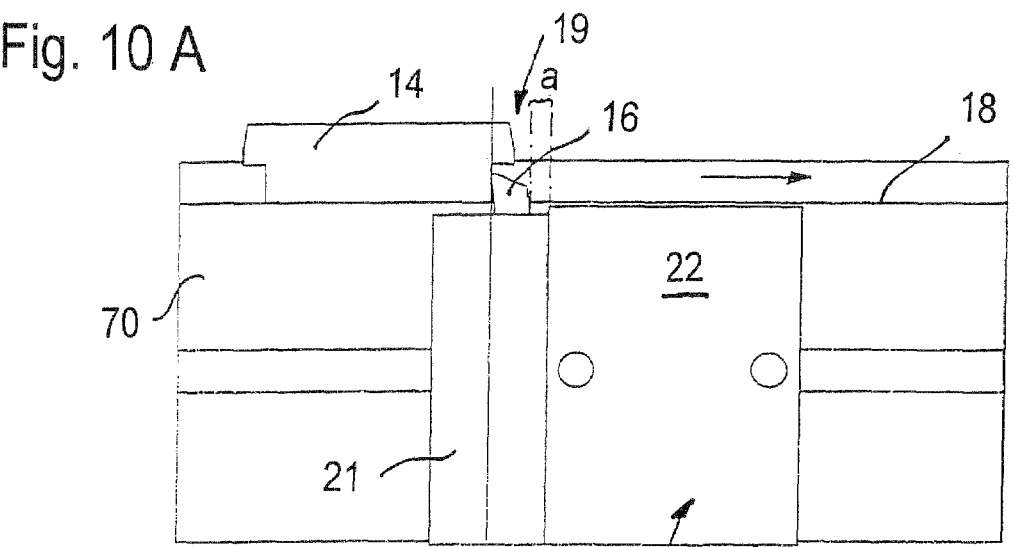
FIGS. 10A-10C show a diagrammatic representation of the abutment module in accordance with the invention as employed on an automatic conveying means, the three sequential steps A through C showing the release of an abutted object by lowering of the abutment member.
Figure 10:
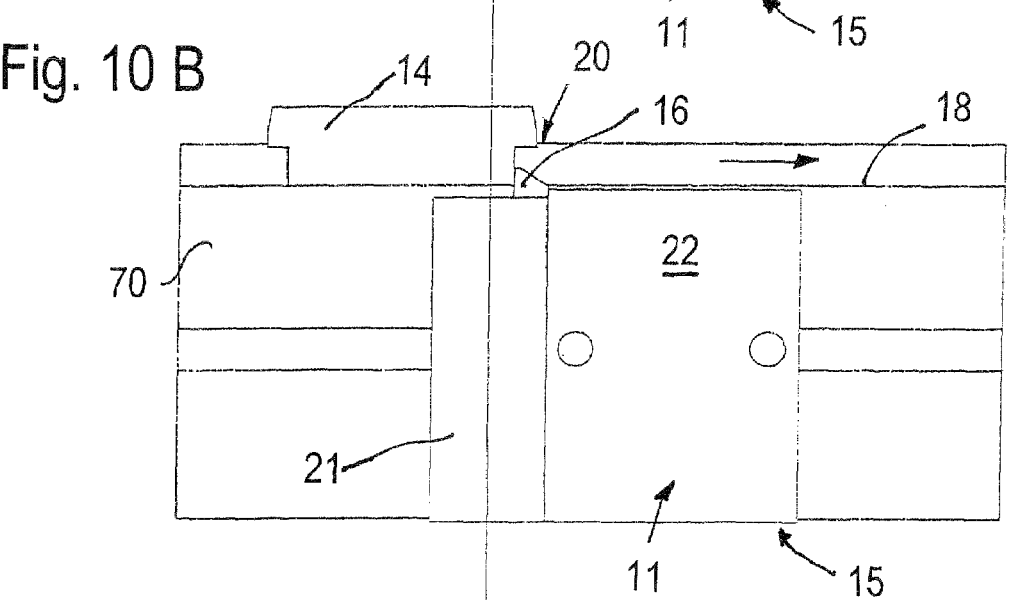
Figure 10:
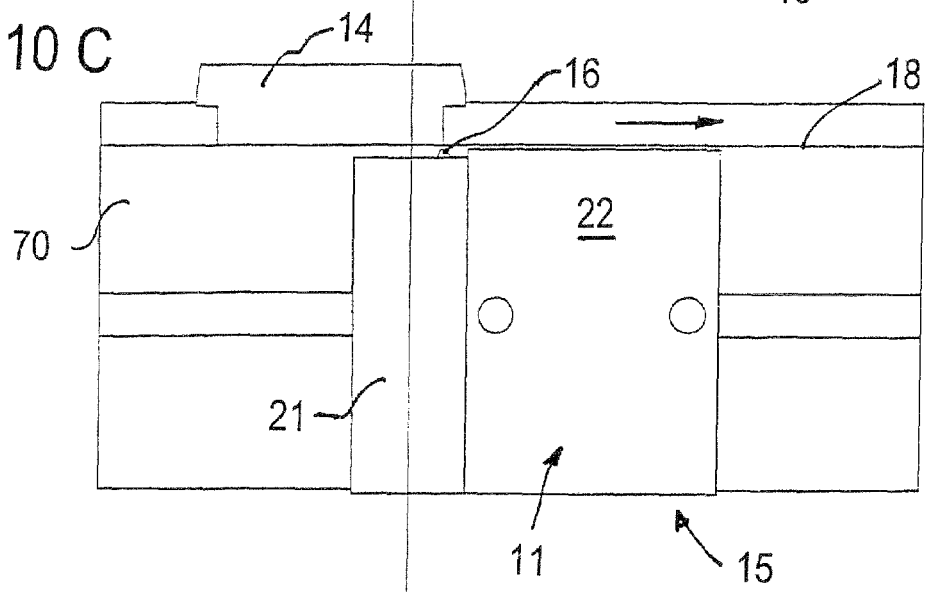

As represented in the FIGS. 10A through 10C the manner of operation of the abutment module is such that an object 14, such as a workpiece and more particularly a machine component or the like, coming from the right firstly reaches the pre abutment; position 19 of the abutment member 16. A further advantage is that in the preabutment position 19 there is such a self braking effect of the abutment member 16 that it can not be thrust downward without operation of the setting member 17. Owing to the impingement of the object 14 the damping piston 39 is shoved into the cylinder space 40, something which means that there is a damped braking of the object 14 until it stops. The abutment member 16 pivots in the working movement direction 13 around the fourth pivot axis 37 so far that the damping piston 39 strikes the rear wall of the cover 44 and accordingly all the air is expelled from the cylinder space 40. Further motion in the damping piston 39 in the working movement direction 13 is not possible so that the abutment position 20 is set. As illustrated in FIG. 10A in particular, the rear side of the abutment member 16 in the abutment position 20 is spaced a distance a from the setting member carrier 22 of the main unit 15. If the object 14 is to continue its movement in the working movement direction 13, the setting member 17 is activated (in the first working example the electromagnet is excited) so that the armature us attracted. There is then a pivoting of the first lever 28 about the first pivot axis 29 which simultaneously slides linearly. Since the first lever 28 cannot be extended the damping cylinder 18 is pulled downward and at the same time pivots about the stationary third pivot axis 35. The result of this is that the abutment member 16 is farther pivoted on in the working movement direction 13 about the fourth pivot axis. This offers the advantage that the struck object 14 even during downward movement of the abutment member, when the member is still above the plane 18 of movement, may be shifted farther in the working movement direction. It is possible that struck or abutted objects 14, which are located on continuously operating conveying means 70, may (owing to the thrust they exert on the abutment member 16) even cause the abutment member to pivot in the working movement direction 13.

Simultaneously the guide pin 52 will move in the guide portion 54 of the guide grooves 51 obliquely downward against the working movement direction 13. Owing to the individual features of the respective guide portions 54 it is possible to ensure that the piston rod 42 is withdrawn from the damping cylinder 38 even on lowering of the abutment member. The bottom end of the respective guide portions 54 finally constitutes the release position 25. In the release position 25 the abutment member 16 is completely underneath the plane 18 of movement with the result that a struck object 14 may be conveyed on farther past the abutment module 11. During the ensuing upward movement of the abutment member in order to stop or individualize the following object 14 the piston rod 42 dwells in its extended position so that the abutment member is automatically returned back into the preabutment position 19 illustrated in FIG. 9.

FIG. 8 shows a second working example of the abutment module 11 in accordance with the invention, which differs from the first working embodiment in that in lieu of an electrical linear drive a fluid power linear drive is utilized. Preferably a pneumatic linear drive is employed. In this case a drive element 24 is provided in the form of a drive piston, which runs linearly in the drive socket 26. The drive piston is then again pivotally joined with the first lever 28 in the manner described above. For driving the drive piston for this purpose of lowering the abutment member 16 the piston side facing the first lever 28 is subjected to the action of compressed air by way of a supply channel 57 so that the drive piston is shifted in the in the working movement direction 13. The drive socket 26 is closed by a cover 58 so that a piston chamber is formed for the drive piston to run in. A return movement of the piston into the position illustrated in FIG. 8 is caused by subjecting the piston side with compressed air.

Figure 9:
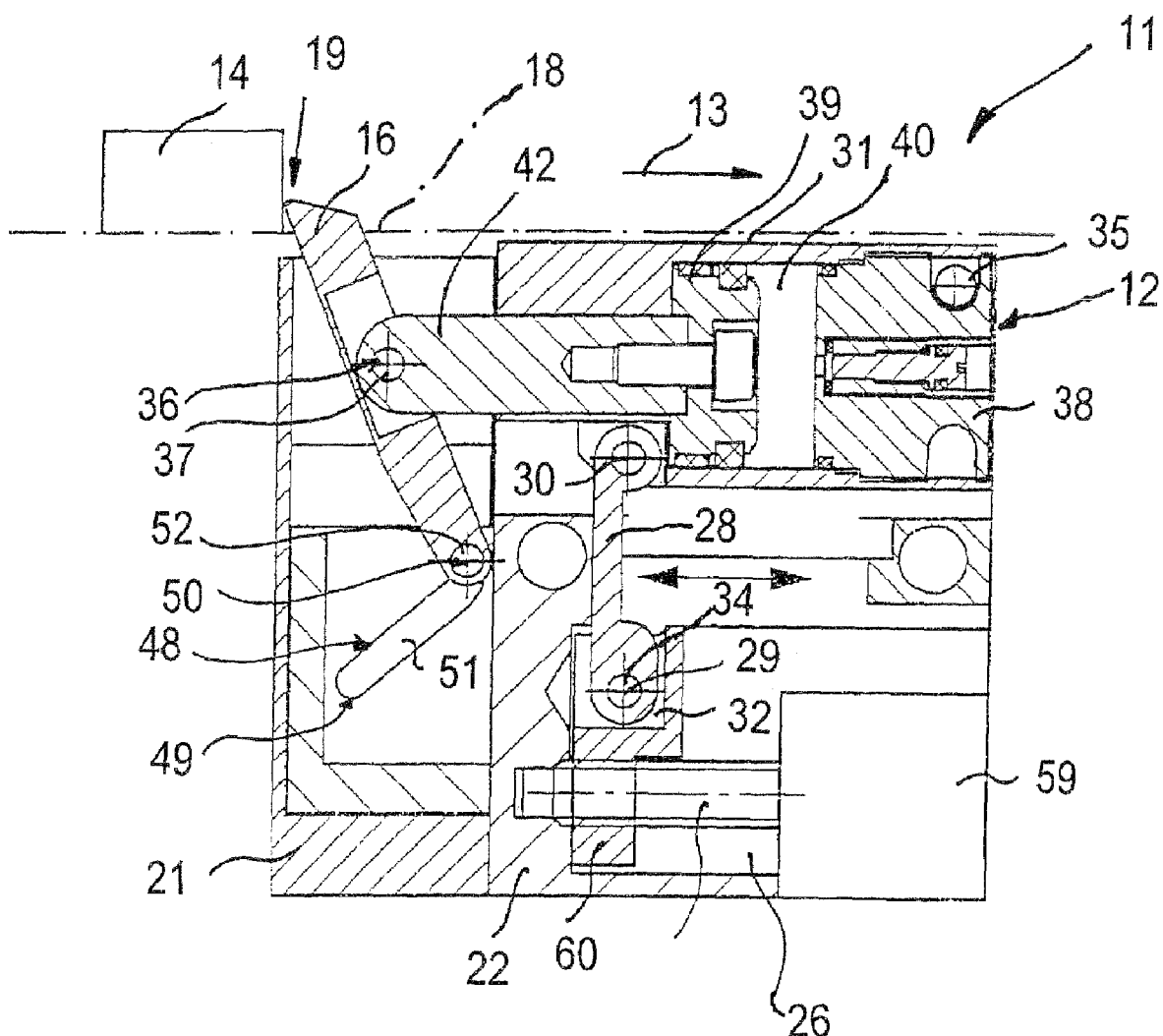
FIG. 9 shows a third embodiment of the abutment module in accordance with the invention in a longitudinal section.

FIG. 9 shows a third working example of the abutment module 11 in accordance with the invention differing from the previously explained working example in that an electrical rotary linear in the form of a lead screw drive is utilized. The lead screw drive possesses a drive element 24, able to be driven in rotation, in the form of a nut which at the same time is borne by bearing means for movement parallel to the plane 18 of motion on the lead screw motor 59. On the lead screw 60 there is a rider 60, which is also moved linearly owing to the linear displacement of the lead screw nut 58. On the rider 60 the first lever 28 is also joined in a pivoting manner.

The invention claimed is:

1. An abutment module, in particular for automatic processing and conveying systems, comprising an abutment member arranged on a main unit for objects moving in a plane of motion in a current working movement direction, such abutment member being able to be shifted by means of a setting member between an abutment position located in the plane of motion and a release position lying underneath the plane of motion, and a guide means having at least one guide track, on which the abutment member is positively guided at a first point between the abutment position and the release position, the abutment member being so pivotally connected at a second point remote from the first point with a setting element that in the case of a lowering movement of the abutment member from the abutment position to the release position a pivoting of the abutment member takes place in the working movement direction.

2. The abutment module as set forth in claim 1, wherein the guide track extends at least partially obliquely to the movement plane.

3. The abutment module as set forth in claim 1, wherein the abutment member has an abutment-matching shape at a top end thereof for the object, which during the movement of the abutment member between the abutment position and the release position describes a predetermined curve.

4. The abutment module as set forth in claim 1, wherein the guide means exhibits a slide guide, with at least one guide slide arranged on the main unit, in which at least one guide member formed on the abutment member at the first point is positively guided.

5. The abutment module as set forth in claim 1, comprising a damping means connected with the abutment member for damped movement of the abutment member from a preabutment position lying short of the abutment position in the working movement direction as far as the abutment position.

6. The abutment module as set forth in claim 5, wherein during its downward movement from the abutment position into the release position owing to the features of the guide track the abutment member is able to be extended at least at the first position in the working movement direction underneath the plane of motion to the level of the preabutment position.

7. The abutment module as set forth in claim 1, comprising force transmission means coupling the setting member with the abutment member with the result that a drive force produced by the setting member is able to be converted into a greater force, which is available at the abutment member.

8. The abutment module as set forth in claim 7, wherein the force transmission means is constituted by a lever transmission means.

9. The abutment module as set forth in claim 8, wherein as a lever transmission a lever means is provided comprising a first lever, which on the one hand is pivotally mounted on the setting member and for linear sliding movement and on the other hand is pivotally joined to a second lever, the latter being on the one hand able to pivot about a stationary pivot axis on the main unit and on the other hand pivotally joined to the abutment member.

10. The abutment module as set forth in claim 9, wherein the second lever is constituted by a damping cylinder of the damping means.

11. The abutment module as set forth in claim 10, wherein the setting member possesses a drive element for producing a drive means directed parallel to the movement plane, such drive movement being able to be converted by way of conversion means into an upward and downward movement occurring between the abutment position and the release position of the abutment member.

12. The abutment module as set forth in claim 11, wherein the setting member is arranged in a linearly sliding manner in a drive socket designed to be parallel to the movement plane in the main unit.

13. The abutment module as set forth in claim 12, wherein the setting member is aligned with its longitudinal side essentially parallel to the movement plane in the drive socket.

\* \* \* \* \*